US012565814B2

(12) United States Patent
Minassa

(10) Patent No.: US 12,565,814 B2
(45) Date of Patent: Mar. 3, 2026

(54) DOWNHOLE WELL TOOL HAVING A CONNECTOR MECHANISM WITH A CLEANING DIELECTRIC CHAMBER FOR WELL SYSTEMS

(71) Applicant: Halliburton Energy Services, Inc., Houston, TX (US)

(72) Inventor: Lorenzzo Minassa, The Woodlands, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 18/638,110

(22) Filed: Apr. 17, 2024

(65) Prior Publication Data

US 2025/0327364 A1 Oct. 23, 2025

(51) Int. Cl.
*E21B 17/02* (2006.01)
*H01R 13/52* (2006.01)

(52) U.S. Cl.
CPC ........ *E21B 17/028* (2013.01); *H01R 13/5213* (2013.01)

(58) Field of Classification Search
CPC .. E21B 17/28; E21B 17/0285; H01R 13/5213
See application file for complete search history.

(56) References Cited

U.S. PATENT DOCUMENTS 4,537,457 A * 8/1985 Davis, Jr. .............. E21B 17/028 439/190
6,776,636 B1 * 8/2004 Cameron ............. H01R 13/523 439/191
11,193,339 B2 12/2021 El Mallawany
11,332,981 B2 5/2022 Lafleur et al.
(Continued)

FOREIGN PATENT DOCUMENTS

WO 2014109750 7/2014
WO 2020081911 4/2020
(Continued)

OTHER PUBLICATIONS

"PCT Application No. PCT/US2024/025072 International Search Report and Written Opinion", Jan. 14, 2025, 9 pages.

*Primary Examiner* — D. Andrews
(74) *Attorney, Agent, or Firm* — DeLizio, Peacock, Lewin & Guerra LLP

(57) ABSTRACT

Systems, methods, and apparatus for establishing a downhole connection between a first well tool and a second well tool. The first well tool may include a mandrel, a first connector assembly, and an elongated protection sleeve. The protection sleeve may form a hydraulic chamber over the mandrel when positioned in a closed position, and the hydraulic chamber may include a dielectric cleaning material. The elongated protection sleeve may be configured to mechanically move to an open position when engaging with a second well tool downhole to release the dielectric cleaning material and connect with the second well tool via the first connector assembly. The dielectric cleaning material may be injected into a cavity between the first connector assembly of the first well tool and a second connector assembly of the second well tool to clean and displace downhole fluids and debris located in the cavity and establish the connection.

17 Claims, 6 Drawing Sheets

(56) References Cited

U.S. PATENT DOCUMENTS

| | | | |
|---|---|---|---|
| 2003/0211768 A1 | 11/2003 | Cameron et al. | |
| 2006/0243454 A1 | 11/2006 | Bolze et al. | |
| 2023/0131231 A1 | 4/2023 | Minassa et al. | |
| 2023/0160275 A1 | 5/2023 | Cox et al. | |
| 2024/0125183 A1* | 4/2024 | Mahendran | E21B 17/028 |

FOREIGN PATENT DOCUMENTS

| | | |
|---|---|---|
| WO | 2020263272 | 12/2020 |
| WO | 2022025913 | 2/2022 |
| WO | 2023076752 | 5/2023 |

* cited by examiner

DOWNHOLE WELL TOOL HAVING A CONNECTOR MECHANISM WITH A CLEANING DIELECTRIC CHAMBER FOR WELL SYSTEMS

TECHNICAL FIELD

The present invention relates generally to oil and gas systems and services, and more specifically to a downhole well tool having a connector mechanism with a cleaning dielectric chamber for well systems.

BACKGROUND

The oil and gas services industry uses various types of downhole well devices or tools in well systems. For example, completion well systems may use a concentric downhole connector to facilitate the removal of an upper completion portion of the well system from the lower completion portion of the well system. In one example, the upper tubing and equipment can be removed, while keeping the lower tubing and equipment (e.g., such as the smart well portion of the well system) downhole. When the concentric downhole connector (which is typically a wet-mate connector) is used for the retrieval operation, the connector typically engages with a concentric downhole receptacle. The downhole receptacle is typically contaminated with downhole liquids, such as completion brine, mud, and other liquid mixes. For example, completion brine may be contaminating most or all of the cavities and seals of the downhole receptacle. The contamination liquids can reduce equipment performance for insulation resistance and can affect the electrical connection between the connector and the receptacle.

DESCRIPTION

The description that follows includes example systems, methods, techniques, and program flows that describe aspects of the disclosure. However, it is understood that this disclosure may be practiced without these specific details. For instance, this disclosure refers to certain well systems, devices, or tools in illustrative examples. Aspects of this disclosure can be instead applied to other types of well systems, devices, and tools. In other instances, well-known instruction instances, protocols, structures, and techniques have not been shown in detail to avoid confusion.

Figure 1:
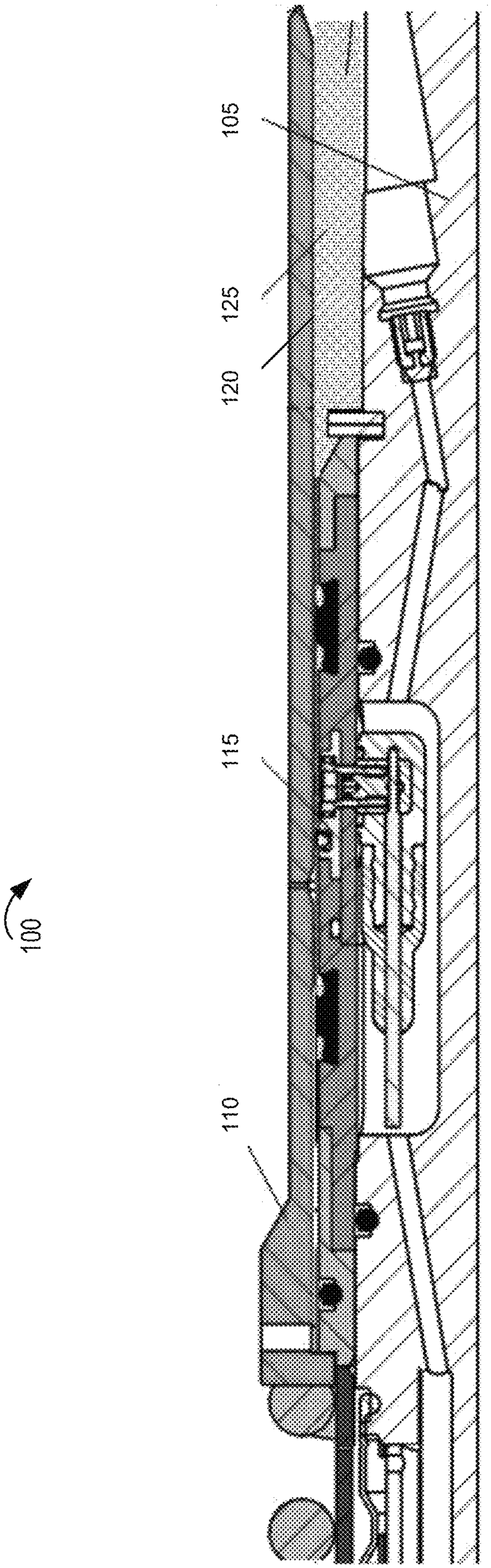
FIG. 1 depicts a schematic diagram of an example well tool including an elongated protection sleeve and a hydraulic chamber with a dielectric cleaning material, according to some implementations.

FIG. 1 depicts a schematic diagram of an example well tool 100 including an elongated protection sleeve and a hydraulic chamber with a dielectric cleaning material, according to some implementations. In some implementations, the well tool 100 may be a concentric downhole wet-mate connector used in completion well systems. For example, the concentric downhole wet-mate connector may be an electric connector or an electro-hydraulic connector. The concentric downhole wet-mate connector may be used in completion well systems for one or more functions, such as to facilitate the removal of the upper completion from the lower completion portion of the system. FIG. 1 shows a cross-sectional diagram of the well tool 100. The well tool 100 may include a connector mandrel 105, an elongated protection sleeve 110, a connector assembly 115, and a hydraulic chamber 120 including a dielectric cleaning material 125.

FIG. 1 shows the elongated protection sleeve 110 of the well tool 100 in a closed position. The elongated protection sleeve 110 is positioned in a closed position as the well tool 100 is lowered into the wellbore of a well system or run in hole (RIH). As shown in FIG. 1, when the elongated protection sleeve 110 is in a closed position, the elongated protection sleeve 110 extends over the connector mandrel 105 to form the hydraulic chamber 120. The hydraulic chamber 120 may house and protect the dielectric cleaning material 125. In some implementations, the dielectric cleaning material may be a dielectric grease. For example, the dielectric grease may be an oil or silicone base mixture that has a lower density than downhole fluids and debris (e.g., completion brine, mud and/or other fluids or debris mixes). The hydraulic chamber 120 with the dielectric cleaning material may be referred to as a cushion of dielectric cleaning material or a cushion of dielectric grease. The elongated protection sleeve 110 may protect the dielectric cleaning material from contamination (or minimize contamination) as the well tool 100 is lowered downhole. For example, the elongated protection sleeve 110 may minimize the amount of brine or other downhole fluid, mud and debris that enters the hydraulic chamber 120. In some implementations, by having a cleaning cushion chamber in the well tool 100, the control of the cushion contamination may depend, at least in part, on the selection the dielectric grease or a combined layer of fluids, which could contribute to minimize the cushion contamination by creating a density fluid barrier between the wellbore fluid and the dielectric cleaning cushion. In some implementation, with the use of multiple fluids (with at least one being a dielectric material), the well tool 100 (e.g., such a concentric downhole wet-mate connector) could be adjusted to maximize performance in mud or completion brine deployments, as well in any unconventional fluid applications.

Figure 2:
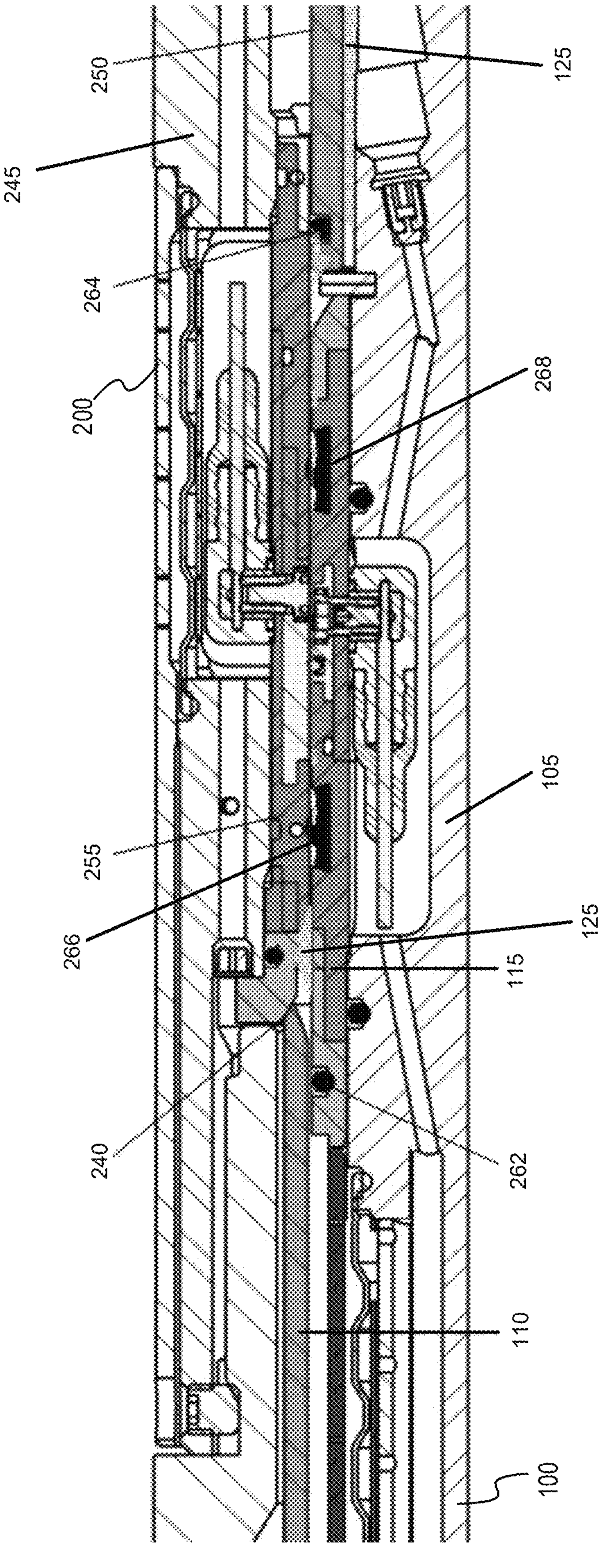
FIG. 2 depicts a schematic diagram of an example well tool engaging with a second well tool to establish a downhole connection, according to some implementations.

In some implementations, the connector assembly 115 may be a male connector assembly that connects with a female connector assembly of a second well tool (such as a receptacle of the downhole wet-mate connector), as will be further described in FIG. 2. The connector assembly 115 may be an electrical connector or an electro-hydraulic connector that can connect with the connector assembly of the second well tool to establish electrical and/or hydraulic conductivity.

FIG. 2 depicts a schematic diagram of an example well tool 100 engaging with a second well tool 200 to establish a downhole connection, according to some implementations. In some implementations, the well tool 100 may be a concentric downhole wet-mate connector used in completion well systems. For example, the concentric downhole wet-mate connector may be an electric connector or an electro-hydraulic connector. As described in FIG. 1, the concentric downhole wet-mate connector may be used in completion well systems for one or more functions, such as to facilitate the removal of the upper completion from the lower completion portion of the system. In some implementations, the well tool 200 may be a concentric downhole wet-mate receptacle. For example, the concentric downhole wet-mate receptacle (e.g., well tool 200) may include a hollow cavity within the mandrel where the concentric downhole wet-mate connector (e.g., the well tool 100) may be inserted to establish a connection, as further described below. The connection may be an electric connection or an electro-hydraulic connection. In some implementations, the connector assembly 115 of the first well tool 100 may be a male connector assembly that connects with a connector assembly 255 of the second well tool 200 that is a female connector, as further described below.

FIG. 2 shows a cross-sectional diagram of the well tool 100 connected or engaged with the well tool 200. As described in FIG. 1, the well tool 100 may include a connector mandrel 105, an elongated protection sleeve 110, and a connector assembly 115. The first well tool 100 may also include an upper seal assembly 262, an upper pillow seal 266, and a lower pillow seal 268. The well tool 200 may include a receptacle mandrel 245, a receptacle protection sleeve 250, a receptacle connector assembly 255, and a wiper ring seal 264. When the well tool 100 engages with or connects to the well tool 200, the dielectric cleaning material 125 within the hydraulic chamber is injected into the cavity between the mandrel 105 and the connector assembly 115 of the first well tool 100 and the receptacle mandrel 245 and the connector assembly 255 of the second well tool 200. Also, after engagement, the connector assembly 115 (e.g., the male connector assembly) of the first well tool 100 establishes a connection with the receptacle connector assembly 255 (e.g., the female connector assembly) of the second well tool 200.

In some implementations, when connecting the first well tool 100 (such as a concentric downhole wet-mate connector) inside the second well tool 200 (such as a concentric downhole wet-mate receptacle), the elongated protection sleeve 110 of the first well tool 100 establishes a metal-to-metal seal 240 against the receptacle connector assembly 255. With the elongated protection sleeve 110 stationary with reference to the second well tool 200 (from the metal-to-metal seal 240), the connector assembly 115 of the first well tool 100 can mechanically move downwards (e.g., in the downhole direction) with the connector mandrel 105, injecting the dielectric cleaning material 125 in the clearance spaces between the receptacle mandrel 245 and the connector mandrel 105. When the dielectric cleaning material 125 is injected into the clearance spaces or cavities between the two connectors, the dielectric cleaning material 125 (such as a dielectric grease) can displace any downhole fluids (such as brine, mud and other fluid mixes) and thereby cleaning and improving the connection area between the two tools. In addition to the dielectric cleaning material 125 performing a cleaning or displacing function, the wiper ring seal 264 (which, in one example, is attached to the receptacle protection sleeve 250) can wipe or clean some of the downhole fluid when the first well tool 100 engages with the second well tool 200 and the receptacle protection sleeve 250 moves in the downhole direction to line up the receptacle connector assembly 255 of the second well tool 200 with the connector assembly 115 of the first well tool 100. Furthermore, the upper pillow seal 266 and the lower pillow seal 268 (which, in one example, are attached to the connector assemble 115) can also wipe or clean some of the downhole fluid when the first well tool 100 engages with the second well tool 200 and the connector assembly 115 is moved in the downhole direction to line up with the receptacle connector assembly 255. Thus, when the first well tool 100 is engaged with the second well too, multiple levels (e.g., such as three levels) of cleaning may be performed to reduce the amount of downhole fluids that are present in the cavity between the two connector assemblies. The three levels of cleaning include the cleaning performed by the wiper ring seal 264, the cleaning and displacing that is performed by the dielectric cleaning material 125, and the cleaning that is performed by the upper pillow seal 266 and the lower pillow seal 268.

In some implementations, at the receptacle protection sleeve 250, the wiper ring seal 264 can isolate the fluid permeating behind (or on the back side) of the receptacle protection sleeve 250. This isolation can promote three functions: (1) it can mechanically protect the female electric contact of the receptacle connector assembly 255 when not engaged or connected with the first well tool 100, (2) it can clean any potential debris that may deposit over the female electric contact of the receptacle connector assembly 255, and (3) it can diverge the dielectric cleaning material 125 inwards, improving the displacement of wellbore fluid (e.g., completion brine and/or other debris) and minimizing the dielectric fluid contamination.

After deployment downhole in the wellbore, the connector assembly 115 of the first well tool 100 can provide an upper dielectric chamber trap, to primarily contain the dielectric cleaning material 125 in place, and prevent migration or fluid contamination by density, and promote a dual pressure barrier at the top side of the connector assembly 115. This chamber can be formed by the upper seal assembly 262 sealing against the internal surface of the elongated protection sleeve 110, the upper pillow seal 266, and the metal-to-metal seal 240 (or metal-to-metal contact) between the receptacle connector assembly 255 and the tip of the elongated protection sleeve 110. The metal-to-metal seal 240 can be biased and boosted by a spring (not shown) that can press on the elongated protection sleeve 110 during the life of the well.

Figure 3:
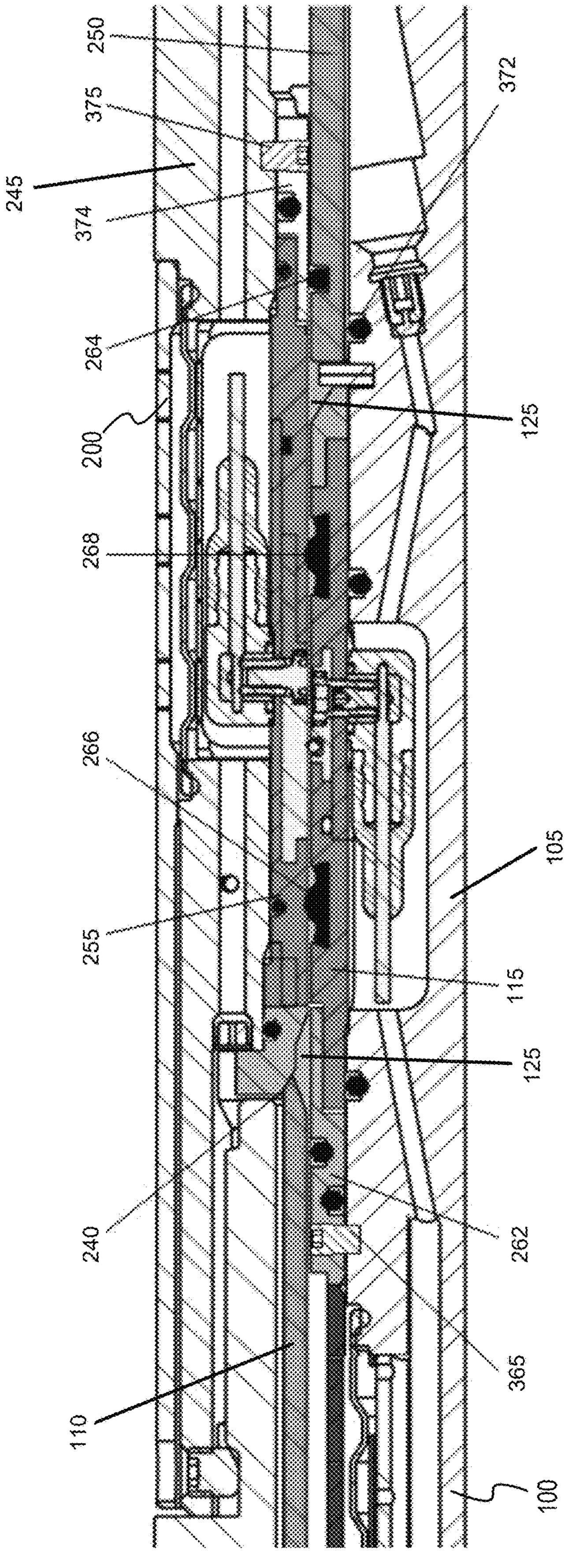
FIG. 3 depicts a schematic diagram of another example well tool engaging with a second well tool to establish a downhole connection, according to some implementations.

FIG. 3 depicts a schematic diagram of another example well tool 100 engaging with a second well tool 200 to establish a downhole connection, according to some implementations. As described in FIG. 2, in some implementations, the well tool 100 may be a concentric downhole wet-mate connector used in completion well systems. For example, the concentric downhole wet-mate connector may be an electric connector or an electro-hydraulic connector. In some implementations, the well tool 200 may be a concentric downhole wet-mate receptacle. For example, the concentric downhole wet-mate receptacle (e.g., well tool 200) may include a hollow cavity within the mandrel where the concentric downhole wet-mate connector (e.g., the well tool 100) may be inserted to establish a connection. The connection may be an electric connection or an electro-hydraulic connection. In some implementations, the connector assembly 115 of the first well tool 100 may be a male connector assembly that connects with a connector assembly 255 of the second well tool 200 that is a female connector.

FIG. 3 shows a cross-sectional diagram of the well tool 100 connected or engaged with the well tool 200. As described in FIG. 1, the well tool 100 may include a connector mandrel 105, an elongated protection sleeve 110, and a connector assembly 115. The first well tool 100 may also include an upper seal assembly 262, an upper pillow seal 266, a lower pillow seal 268, and a connector screw 365. The well tool 200 may include a receptacle mandrel 245, a receptacle protection sleeve 250, a receptacle connector assembly 255, a wiper ring seal 264, an internal lower seal 372, a lower seal assembly 374, and a receptacle screw 375. When the well tool 100 engages with or connects to the well tool 200, the dielectric cleaning material 125 within the hydraulic chamber is injected into the cavity between the connector mandrel 105 and the connector assembly 115 of the first well tool 100 and the receptacle mandrel 245 and the connector assembly 255 of the second well tool 200. Also, after engagement, the connector assembly 115 (e.g., the male connector assembly) of the first well tool 100 establishes a connection with the receptacle connector assembly 255 (e.g., the female connector assembly) of the second well tool 200.

In some implementations, the internal lower seal 372 can be installed to provide an isolation between the connector mandrel 105 and the internal surface of the receptacle protection sleeve 250. The placement of the internal lower seal 372 can provide a lower dielectric chamber trap, isolated by the receptacle protection sleeve 250, the internal lower seal 372, and the lower pillow seal 268. The connection between the first well tool 100 and the second well tool 200 when the second well tool 200 includes the internal lower seal 372 can provide a fully redundant electrical connector isolation, with a dual dielectric and pressure barrier for the electric contacts. In the design having the internal lower seal 372, the upper pillow seal 266 and the lower pillow seal 268 can be isolated from hydrogen sulfide (H2S) gases or harmful wellbore fluids, annular pressure fluctuations may not cause axial loads for the system, and there may be a tendency to achieve enhanced long-term insulation resistance (IR) performance.

In some implementations, to prevent axial load on the electrical connectors (such as the connector assembly 115 and receptacle connector assembly 255), at least one connector screw 365 can be installed in the connector assembly 115 and at least one receptacle screw 375 can be installed in the receptacle connector assembly 255. As shown in FIG. 3, in one example, at least one connector screw 365 can be installed in the upper seal assembly 262 and at least one receptacle screw 375 can be installed in the lower seal assembly 374. A gap between the upper seal assembly 262 and the lower seal assembly 374 can provide the tolerance to prevent axial loads on the connectors when forces are applied in the system.

In some implementations, the use of the internal lower seal 372 may be optional. In some implementations, depending on the wellbore conditions, the internal lower seal 372 could be removed for one-trip deployments. By removing this seal, the wellbore hydrostatic pressure could be transferred by the dielectric fluid through the pillow seals (such as the upper pillow seal 266 and the lower pillow seal 268), which may accommodate and transfer this pressure in this low volume system. The upper pillow seal 266 and the lower pillow seal 268 may be designed to hold high differential pressures and tend to communicate at allowed pressure differential, which may enable all systems to be equalized. In some implementations, in a dual-trip deployment, after removing the internal lower seal 372 for the first trip, the internal lower seal 372 can be installed for the second trip, providing full redundancy for the electric contact isolation in a field configurable design.

As described above in FIGS. 1-3, the first well tool 100 may include a hydraulic chamber having a cleaning dielectric material (which may be referred to as a cleaning dielectric cushion) for enhanced downhole IR performance. The first well tool 100 and the second well tool 200 may include seal mechanism that achieve fully redundant electrical connector isolation, and dual dielectric and pressure barrier for the electric contacts. The first well tool 100 may include pillow seals that can achieve isolation from H2S or potentially harmful wellbore fluids. When the first well tool 100 and the second well tool 200 are connected, annular pressure fluctuations may not cause axial loads on the system. Also, the system may achieve enhanced long-term IR performance. Additionally, multiple fluids configuration (with at least one being dielectric) can maximize performance in mud or completion brine deployments, as well in any unconventional fluid applications. Furthermore, when the first well tool 100 and the second well tool 200 are connected, the system may include multiple levels of cleaning to reduce downhole completion fluids in the cavity of the connectors.

Figure 4:
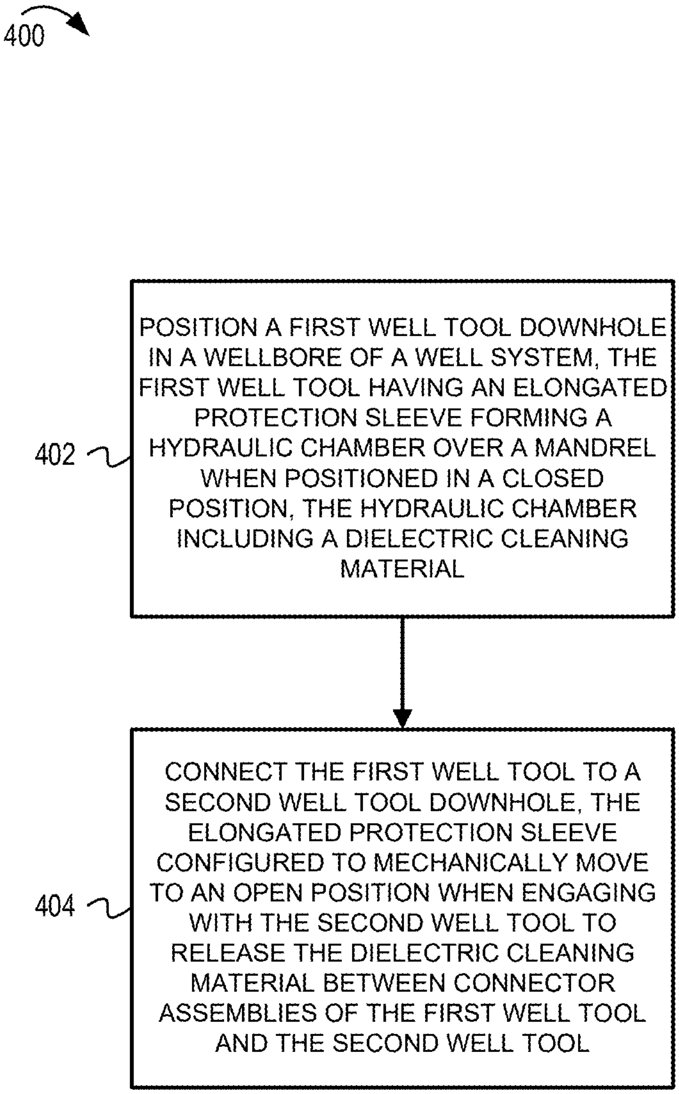
FIG. 4 is a flowchart of example operations for establishing a downhole connection between a first well tool and a second well tool, according to some implementations.

FIG. 4 is a flowchart 400 of example operations for establishing a downhole connection between a first well tool and a second well tool, according to some implementations. In some implementations, the first well tool may perform a downhole tool cleaning process using at least a dielectric cleaning material when establishing the connection between the first well tool and the second well tool.

In some implementations, the first well tool may be positioned downhole in a wellbore of a well system. The first well tool may include an elongated protection sleeve forming a hydraulic chamber over a mandrel when positioned in a closed position. The hydraulic chamber may include a dielectric cleaning material (block 402). In some implementations, the first well tool may be connected to a second well tool downhole. The elongated protection sleeve may be configured to mechanically move to an open position when engaging with the second well tool downhole to release the dielectric cleaning material between connector assemblies of the first well tool and the second well tool (block 404).

In some implementations, the elongated protection sleeve may be configured to mechanically move to the open position when engaging with the second well tool downhole to inject the dielectric cleaning material into a cavity between the first connector assembly of the first well tool and a second connector assembly of the second well tool. In some implementations, the dielectric cleaning material may be injected into the cavity between the first connector assembly of the first well tool and the second connector assembly of the second well tool to clean and displace downhole fluids and debris located in the cavity and to establish the connection between the first connector assembly of the first well tool and the second connector assembly of the second well tool. In some implementations, the elongated protection sleeve may be configured to establish a metal-to-metal seal between the first well tool and the second well tool, and after the metal-to-metal seal is established, the first connector assembly may be configured to mechanically move in a downhole direction to establish a connection with the second connector assembly of the second well tool.

In some implementations, the first well tool may include at least an upper pillow seal and a lower pillow seal coupled with the first connector assembly. The released dielectric cleaning material, the upper and lower pillow seals, and a wiper ring seal coupled with a lower protection sleeve of the second well tool may be configured to perform a multi-level cleaning of a cavity between the first connector assembly of the first well tool and a second connector assembly of the second well tool. In some implementations, the first well tool may include an upper seal assembly coupled with the first connector assembly. The upper seal assembly of the first well tool and a lower seal assembly and an internal lower seal of the second well tool may be configured to establish a pressure barrier for the first connector assembly of the first well tool and the second connector assembly of the second well tool. In some implementations, the first well tool may include an upper securing mechanism (e.g., one or more upper screws or other securing devices) coupled with the first connector assembly. The upper securing mechanism and a lower securing mechanism (e.g., one or more lower screws or other securing devices) coupled with the second connector assembly of the second well tool may be configured to reduce axial loads on the first connector assembly of the first well tool and the second connector assembly of the second well tool.

Figure 5:
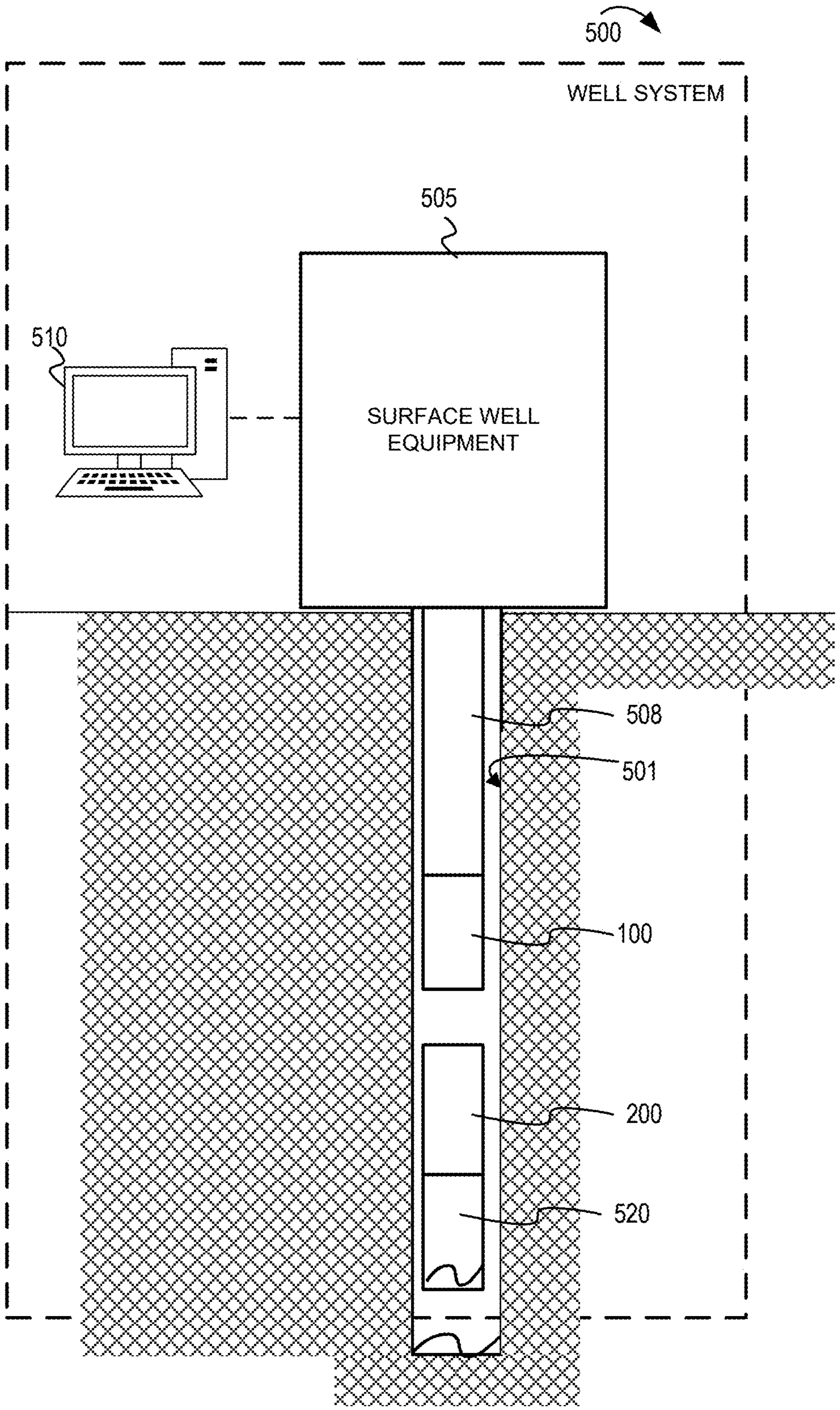
FIG. 5 depicts a schematic diagram of an example well system including a first well tool and a second well tool, according to some implementations.

FIG. 5 depicts a schematic diagram of an example well system 500 including a first well tool 100 and a second well tool 200. In some implementations, the well system 500 may include surface well equipment 505, a workstring 508, a computer system 510, a first well tool 100, a second well tool 200, and upper completion equipment 520. The well system 500 may also include lower completion equipment that are not shown for simplicity. The first well tool 100 may be a concentric downhole connector tool and the second well tool 200 may be a concentric downhole receptacle tool, as described above in FIGS. 1-4. In some implementations, the workstring 508 may lower the first well tool 100 into the wellbore 501 to engage with the second well tool 200, perform the cleaning operations in the cavity between the connector assemblies of the first well tool 100 and the second well tool 200, and establish a connection with the second well tool 200. In some implementations, the first well tool 100 may connect with the second well 200 in order to recover the upper completion equipment 520, as described above in FIGS. 1-4. In some implementations, the well system 100 may be a completion well system, but in other implementations the well system 100 may be any type of oil and gas well systems, such as drilling, production, and workover well systems. In some implementations, the surface well equipment 105 may be any type of surface well equipment that are used in well systems, such as a well platform, a derrick, a rotary table, a Kelly, data collection systems, power generation systems, sensors (pressure sensors, temperature sensors, etc.), surge tanks, transfer pumps, separators, multi-phase flow meters, choke manifolds, chemical injection pumps, solids collection systems, mud pumps, pump trucks, water tanks, among others. In some implementations, the computer system 110 may be considered part of the surface well equipment. The computer system 510 may be communicatively coupled to any sensors, control devices, and tools attached to surface equipment or to the downhole equipment (e.g., such as the workstring 508, the first well tool 100 and the second well tool 200). In some implementations, the type of surface well equipment 105 that is included in the well system 100 may depend on the type of well system 100.

Figure 6:
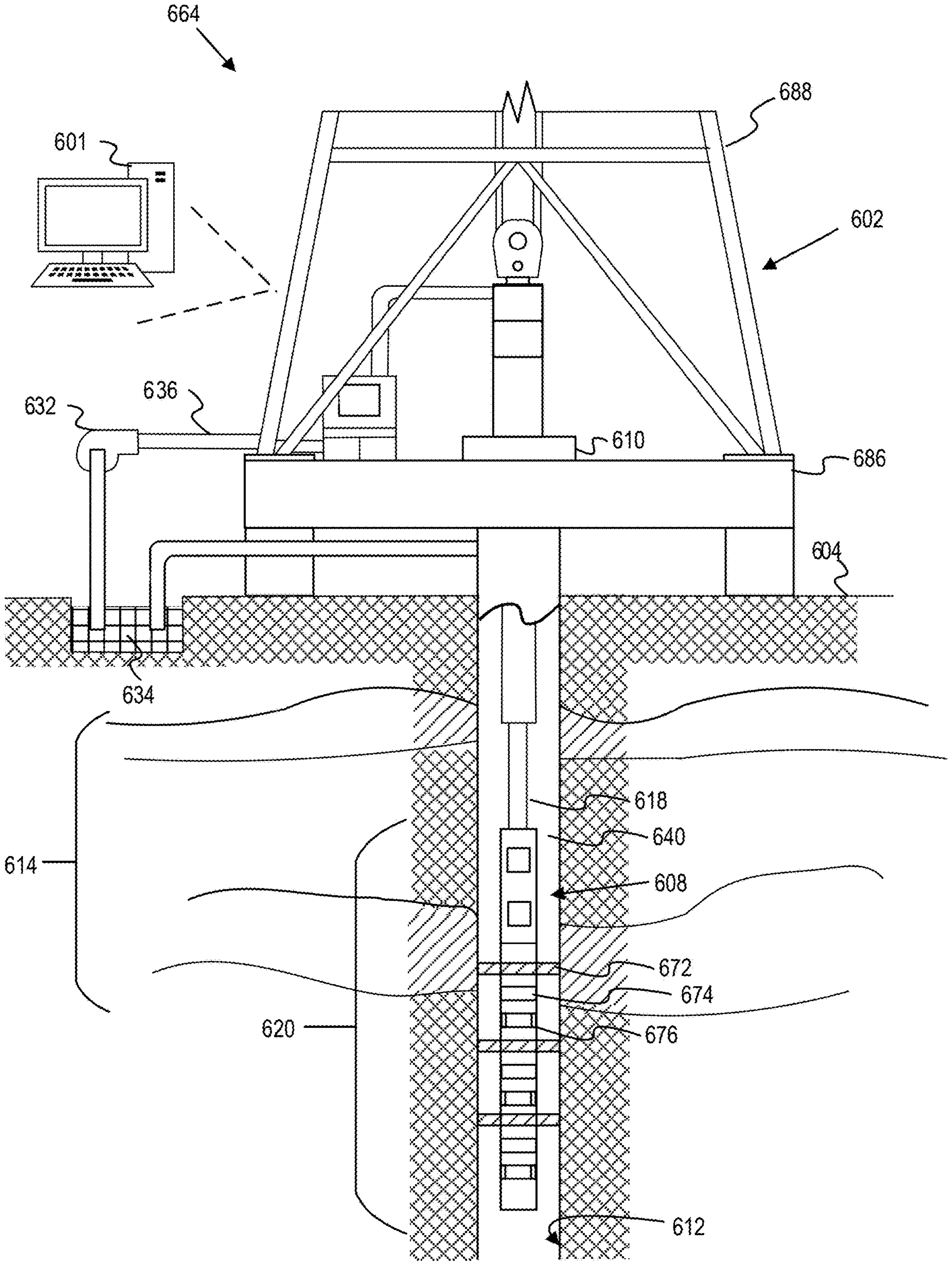
FIG. 6 is a schematic diagram of another example well system that uses surface and downhole equipment, according to some implementations.

FIG. 6 is a schematic diagram of another example well system that uses surface and downhole equipment, according to some implementations. For example, in FIG. 6 it can be seen how a system 664 may also form a portion of a drilling rig 602 located at the surface 604 of a well, when performing completion activities. It is noted that while completion system 664 may be illustrated as land-based, the present techniques may also be applicable in offshore applications. Completion of oil and gas wells is commonly carried out using a string of production tubes or drill pipes connected together so as to form a work-string or production string 608 that may be lowered through a rotary table 610 into a wellbore 612. Here a drilling or completion platform 686 may be equipped with a derrick 688 that supports a hoist. A computer system 601 may be communicatively coupled to any sensors, control devices, and tools attached to surface equipment or to the downhole equipment (e.g., downhole well devices and downhole well tools) of the system 664.

The drilling rig 602 may provide support for the work-string or production string 608. The production string 608 may operate to penetrate the rotary table 610 for completion of the wellbore 612 through subsurface formations or casings 614. The production string 608 may include drill pipes or production tubing 618, and an intelligent completion system 620, perhaps located at the lower portion of the production tubing 618.

The Intelligent completion system 620 may include one or more sections or zones of packers 672, interval control valves (ICVs) 676, and downhole gauges 674 (e.g., such as permanent monitoring downhole gauges), or chemical injection systems. It is noted that the intelligent completion system 620 may include additional components that are not shown for simplicity.

Completion operations may utilize various surface equipment, such as a mud pump 632 or other types of surface equipment. The surface equipment may be outfitted with one or more sensors and one or more control devices. During completion operations, the mud pump 632 may pump completion fluid (sometimes known by those of ordinary skill in the art as "completion brine") from a trip tank 634 through a hose 636 into the production tubing 618 and down to the intelligent completion system 620. In some implementations, one or more sensors may monitor one or more metrics of the pump drilling fluid (such as flow rate), and one or more control devices may control one or more operations of the mud pump 632 (such as opening and closing one or more valves or other mechanisms). The completion fluid may flow out from the ICV 676 and be returned to the surface 604 through an annular area 640 between the production string 618 and the sides of the wellbore 612. The completion fluid may then be returned to the trip tank 634, where such fluid may be filtered. In some embodiments, the completion fluid may be used to displace the drilling mud, as well as to provide hydrostatic over-balance against the formation pressure. Additionally, the completion fluid may be used to remove wellbore debris.

Although example well systems are shown in FIGS. 5-6, it is noted, however, that the operations and tools described in FIGS. 1-4 can be used in any type of well system in the oil and gas industry. For example, the well systems may be any type of drilling well systems, completion well systems, and producing well systems.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

None of the implementations described herein may be performed exclusively in the human mind nor exclusively using pencil and paper. None of the implementations described herein may be performed without computerized components such as those described herein. Some implementations may perform additional operations, fewer operations, operations in parallel or in a different order, and some operations differently.

While the aspects of the disclosure are described with reference to various implementations and exploitations, it will be understood that these aspects are illustrative and that the scope of the claims is not limited to them. In general, techniques for implementing a downhole well tool having a connector mechanism with a cleaning dielectric chamber for well systems as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

Furthermore, unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

EXAMPLE EMBODIMENTS

Example Embodiments can include the following:

Embodiments #1: A first well tool for a well system, comprising: a mandrel; a first connector assembly; and an elongated protection sleeve forming a hydraulic chamber over the mandrel when positioned in a closed position, the hydraulic chamber including a dielectric cleaning material, the elongated protection sleeve configured to mechanically move to an open position when engaging with a second well tool downhole to release the dielectric cleaning material and connect with the second well tool via the first connector assembly.

Embodiments #2: The first well tool of Embodiments #1, wherein the elongated protection sleeve is configured to mechanically move to the open position when engaging with the second well tool downhole to inject the dielectric cleaning material into a cavity between the first connector assembly of the first well tool and a second connector assembly of the second well tool.

Embodiments #3: The first well tool of Embodiments #2, wherein the dielectric cleaning material is injected into the cavity between the first connector assembly of the first well tool and the second connector assembly of the second well tool to clean and displace downhole fluids and debris located in the cavity and to establish a connection between the first connector assembly of the first well tool and the second connector assembly of the second well tool.

Embodiments #4: The first well tool of Embodiments #2, wherein the elongated protection sleeve is configured to establish a metal-to-metal seal between the first well tool and the second well tool, and after the metal-to-metal seal is established, the first connector assembly is configured to mechanically move in a downhole direction to establish a connection with the second connector assembly of the second well tool.

Embodiments #5: The first well tool of Embodiments #1, further comprising at least an upper pillow seal and a lower pillow seal coupled with the first connector assembly, wherein the released dielectric cleaning material, the upper and lower pillow seals, and a wiper ring seal coupled with a lower protection sleeve of the second well tool are configured to perform a multi-level cleaning of a cavity between the first connector assembly of the first well tool and a second connector assembly of the second well tool.

Embodiments #6: The first well tool of Embodiments #1, further comprising an upper seal assembly coupled with the first connector assembly, wherein the upper seal assembly of the first well tool and a lower seal assembly and an internal lower seal of the second well tool are configured to establish a pressure barrier for the first connector assembly of the first well tool and the second connector assembly of the second well tool.

Embodiments #7: The first well tool of Embodiments #1, further comprising an upper securing mechanism coupled with the first connector assembly, wherein the upper securing mechanism and a lower securing mechanism coupled with the second connector assembly of the second well tool are configured to reduce axial loads on the first connector assembly of the first well tool and the second connector assembly of the second well tool.

Embodiments #8: The first well tool of Embodiments #1, wherein the first well tool is a concentric downhole connector tool and the second well tool is a concentric downhole receptacle tool.

Embodiments #9: A method for establishing a downhole connection between a first well tool and a second well tool, comprising: positioning a first well tool downhole in a wellbore of a well system, the first well tool having an elongated protection sleeve forming a hydraulic chamber over a mandrel when positioned in a closed position, the hydraulic chamber including a dielectric cleaning material; and connecting the first well tool to a second well tool downhole, the elongated protection sleeve configured to mechanically move to an open position when engaging with the second well tool downhole to release the dielectric cleaning material between connector assemblies of the first well tool and the second well tool.

Embodiments #10: The method of Embodiments #9, wherein the connector assemblies include a first connector assembly of the first well tool and a second connector assembly of the second well tool, further comprising: injecting the dielectric cleaning material into a cavity between the first connector assembly of the first well tool and the second connector assembly of the second well tool when the elongated protection sleeve mechanically moves to the open position when engaging with the second well tool downhole.

Embodiments #11: The method of Embodiments #10, wherein the dielectric cleaning material is injected into the cavity between the first connector assembly of the first well tool and the second connector assembly of the second well tool to clean and displace downhole fluids and debris located in the cavity and to establish the connection between the first connector assembly of the first well tool and the second connector assembly of the second well tool.

Embodiments #12: The method of Embodiments #10, further comprising: establishing a metal-to-metal seal between the first well tool and the second well tool using the elongated protection sleeve; and after the metal-to-metal seal is established, mechanically moving the first connector assembly in a downhole direction to establish the connection with the second connector assembly of the second well tool.

Embodiments #13: The method of Embodiments #9, further comprising performing a multi-level cleaning of a cavity between the first connector assembly of the first well tool and a second connector assembly of the second well tool using the released dielectric cleaning material, upper and lower pillow seals of the first well tool, and a wiper ring seal of the second well tool.

Embodiments #14: A well system, comprising: a first well tool including a mandrel, a first connector assembly, and an elongated protection sleeve, the elongated protection sleeve forming a hydraulic chamber over the mandrel when positioned in a closed position, the hydraulic chamber including a dielectric cleaning material; and a second well tool including a second connector assembly, wherein the elongated protection sleeve of the first well tool is configured to mechanically move to an open position when engaging with the second well tool downhole to release the dielectric cleaning material and connect the first connector assembly of the first well tool to the second connector assembly of the second well tool.

Embodiments #15: The well system of Embodiments #14, wherein the elongated protection sleeve is configured to mechanically move to the open position when engaging with the second well tool downhole to inject the dielectric cleaning material into a cavity between the first connector assembly of the first well tool and the second connector assembly of the second well tool.

Embodiments #16: The well system of Embodiments #15, wherein the dielectric cleaning material is injected into the cavity between the first connector assembly of the first well tool and the second connector assembly of the second well tool to clean and displace downhole fluids and debris located in the cavity and to establish the connection between the first connector assembly of the first well tool and the second connector assembly of the second well tool.

Embodiments #17: The well system of Embodiments #15, wherein the elongated protection sleeve is configured to establish a metal-to-metal seal between the first well tool and the second well tool, and after the metal-to-metal seal is established, the first connector assembly is configured to mechanically move in a downhole direction to establish the connection with the second connector assembly of the second well tool.

Embodiments #18: The well system of Embodiments #14, wherein the first well tool further includes at least an upper pillow seal and a lower pillow seal coupled with the first connector assembly and the second well tool further includes a wiper ring seal coupled with a lower protection sleeve of the second well tool, wherein the released dielectric cleaning material, the upper and lower pillow seals, and the wiper ring seal are configured to perform a multi-level cleaning of a cavity between the first connector assembly of the first well tool and the second connector assembly of the second well tool.

Embodiments #19: The well system of Embodiments #14, wherein the first well tool further includes an upper seal assembly coupled with the first connector assembly and the second well tool further includes a lower seal assembly and an internal lower seal, wherein the upper seal assembly of the first well tool and the lower seal assembly and the internal lower seal of the second well tool are configured to establish a pressure barrier for the first connector assembly of the first well tool and the second connector assembly of the second well tool.

Embodiments #20: The well system of Embodiments #14, wherein the first well tool further includes an upper securing mechanism coupled with the first connector assembly and the second well tool further includes lower securing mechanism coupled with the second connector assembly, wherein the upper securing mechanism and the lower securing mechanism are configured to reduce axial loads on the first connector assembly of the first well tool and the second connector assembly of the second well tool.

What is claimed is:

1. A first well tool for a well system, comprising:

a mandrel;

a first connector assembly;

an upper pillow seal and a lower pillow seal coupled with the first connector assembly; and an elongated protection sleeve forming a hydraulic chamber over the mandrel when positioned in a closed position, the hydraulic chamber including a dielectric cleaning material, the elongated protection sleeve configured to mechanically move to an open position when engaging with a second well tool downhole to release the dielectric cleaning material and connect the first connector assembly of the first well tool with a second connector assembly of the second well tool, wherein, when the first well tool engages with the second well tool, the released dielectric cleaning material, the upper and lower pillow seals, and a wiper ring seal of the second well tool are configured to perform a multi-level cleaning of a cavity between the first connector assembly of the first well tool and the second connector assembly of the second well tool.

2. The first well tool of claim 1, wherein the elongated protection sleeve is configured to mechanically move to the open position when engaging with the second well tool downhole to inject the dielectric cleaning material into the cavity between the first connector assembly of the first well tool and the second connector assembly of the second well tool.

3. The first well tool of claim 2, wherein the dielectric cleaning material is injected into the cavity between the first connector assembly of the first well tool and the second connector assembly of the second well tool to clean and displace downhole fluids and debris located in the cavity and to establish a connection between the first connector assembly of the first well tool and the second connector assembly of the second well tool.

4. The first well tool of claim 2, wherein the elongated protection sleeve is configured to establish a metal-to-metal seal between the first well tool and the second well tool, and after the metal-to-metal seal is established, the first connector assembly is configured to establish a connection with the second connector assembly of the second well tool.

5. The first well tool of claim 1, further comprising an upper seal assembly coupled with the first connector assembly, wherein, when the first well tool engages with the second well tool, the upper seal assembly of the first well tool and a lower seal assembly and an internal lower seal of the second well tool are configured to establish a pressure barrier for the first connector assembly of the first well tool and the second connector assembly of the second well tool.

6. The first well tool of claim 1, further comprising an upper securing mechanism coupled with the first connector assembly, wherein, when the first well tool engages with the second well tool, the upper securing mechanism and a lower securing mechanism coupled with the second connector assembly of the second well tool are configured to reduce axial loads on the first connector assembly of the first well tool and the second connector assembly of the second well tool.

7. The first well tool of claim 1, wherein the first well tool is a concentric downhole connector tool.

8. A method for establishing a downhole connection between a first well tool and a second well tool, comprising:

positioning a first well tool downhole in a wellbore of a well system, the first well tool having an elongated protection sleeve forming a hydraulic chamber over a mandrel when positioned in a closed position, the hydraulic chamber including a dielectric cleaning material;

connecting the first well tool to a second well tool downhole, the elongated protection sleeve configured to mechanically move to an open position when engaging with the second well tool downhole to release the dielectric cleaning material between a first connector assembly of the first well tool and a second connector assembly of the second well tool; and performing a multi-level cleaning of a cavity between the first connector assembly of the first well tool and the second connector assembly of the second well tool using the released dielectric cleaning material, upper and lower pillow seals of the first well tool, and a wiper ring seal of the second well tool.

9. The method of claim 8, further comprising:

injecting the dielectric cleaning material into the cavity between the first connector assembly of the first well tool and the second connector assembly of the second well tool when the elongated protection sleeve mechanically moves to the open position when engaging with the second well tool downhole.

10. The method of claim 9, wherein the dielectric cleaning material is injected into the cavity between the first connector assembly of the first well tool and the second connector assembly of the second well tool to clean and displace downhole fluids and debris located in the cavity and to establish a connection between the first connector assembly of the first well tool and the second connector assembly of the second well tool.

11. The method of claim 10, further comprising:

establishing a metal-to-metal seal between the first well tool and the second well tool using the elongated protection sleeve; and after the metal-to-metal seal is established, mechanically moving the first connector assembly in a downhole direction to establish the connection with the second connector assembly of the second well tool.

12. A well system, comprising:

a first well tool including a mandrel, a first connector assembly, an upper pillow seal, a lower pillow seal, and an elongated protection sleeve, the upper pillow seal and the lower pillow seal coupled with the first connector assembly, the elongated protection sleeve forming a hydraulic chamber over the mandrel when positioned in a closed position, the hydraulic chamber including a dielectric cleaning material; and a second well tool including a second connector assembly, a lower protection sleeve, and a wiper ring seal, the wiper ring seal coupled with the lower protection sleeve, wherein the elongated protection sleeve of the first well tool is configured to mechanically move to an open position when engaging with the second well tool downhole to release the dielectric cleaning material and connect the first connector assembly of the first well tool to the second connector assembly of the second well tool, wherein the released dielectric cleaning material, the upper and lower pillow seals, and the wiper ring seal are configured to perform a multi-level cleaning of a cavity between the first connector assembly of the first well tool and the second connector assembly of the second well tool.

13. The well system of claim 12, wherein the elongated protection sleeve is configured to mechanically move to the open position when engaging with the second well tool downhole to inject the dielectric cleaning material into the cavity between the first connector assembly of the first well tool and the second connector assembly of the second well tool.

14. The well system of claim 13, wherein the dielectric cleaning material is injected into the cavity between the first connector assembly of the first well tool and the second connector assembly of the second well tool to clean and displace downhole fluids and debris located in the cavity and to establish a connection between the first connector assembly of the first well tool and the second connector assembly of the second well tool.

15. The well system of claim 13, wherein the elongated protection sleeve is configured to establish a metal-to-metal seal between the first well tool and the second well tool, and after the metal-to-metal seal is established, the first connector assembly is configured to establish a connection with the second connector assembly of the second well tool.

16. The well system of claim 12, wherein the first well tool further includes an upper seal assembly coupled with the first connector assembly and the second well tool further includes a lower seal assembly and an internal lower seal, wherein the upper seal assembly of the first well tool and the lower seal assembly and the internal lower seal of the second well tool are configured to establish a pressure barrier for the first connector assembly of the first well tool and the second connector assembly of the second well tool.

17. The well system of claim 12, wherein the first well tool further includes an upper securing mechanism coupled with the first connector assembly and the second well tool further includes lower securing mechanism coupled with the second connector assembly, wherein the upper securing mechanism and the lower securing mechanism are configured to reduce axial loads on the first connector assembly of the first well tool and the second connector assembly of the second well tool.

* * * * *